Dec. 28, 1965  O. WALTHERS  3,226,022
GAME SCORING INDICATOR
Filed April 8, 1963
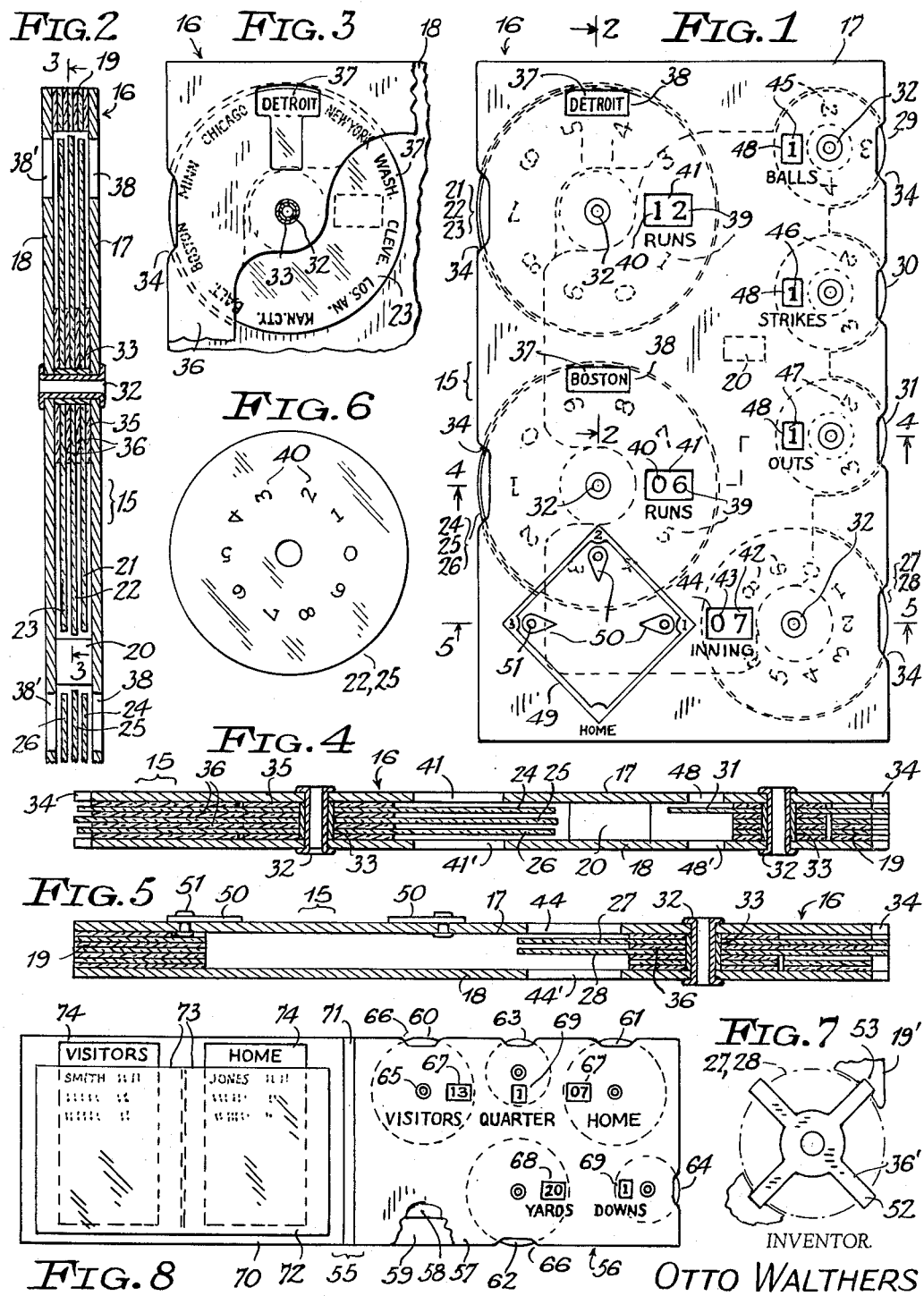
INVENTOR.
OTTO WALTHERS
BY Christopher L. Waal
ATTORNEY United States Patent Office 3,226,022
Patented Dec. 28, 1965

3,226,022
GAME SCORING INDICATOR
Otto Walthers, 1702 N. 4th St., Milwaukee, Wis.
Filed Apr. 8, 1963, Ser. No. 271,178
6 Claims. (Cl. 235—114)

The invention relates to indicators adapted for use in game scoring and the like.

An object of the invention is to provide an improved and compact indicator in which coaxially disposed indicator disks are arranged for simultaneouslsy displaying a plurality of selected indicia.

Another object is to provide an indicator including simple but effective means for preventing undesired frictional drive between adjacent indicator disks.

Still another object is to provide an indicator including a plurality of windows for displaying different indicia on the coaxial disks.

A further object is to provide an indicator which is of simple and inexpensive construction and is capable of easy manipulation.

The invention further consists in the several features hereinafter described and claimed.

In the accompanying drawing, illustrating certain embodiments of the invention,

FIG. 1 is a top plan view of one form of game scoring indicator constructed in accordance with the invention and arranged for use in baseball scoring;

FIG. 2 is a transverse sectional view taken generally on the line 2—2 of FIG. 1 but on a larger scale than FIG. 1;

FIG. 3 is a fragmentary detail view taken generally on the line 3—3 of FIG. 2 but on the same scale as FIG. 1, parts being shown in section;

FIG. 4 is a transverse sectional view taken generally on the line 4—4 of FIG. 1 but on a larger scale than FIG. 1;

FIG. 5 is a transverse sectional view taken generally on the line 5—5 of FIG. 1 but on a larger scale than FIG. 1;

FIG. 6 is a detail plan view of one of the indicator disks;

FIG. 7 is a fragentary top plan view of a modified form of disk spacer, and

FIG. 8 is a top plan view of a modified form of scoring indicator adapted for use in football scoring, parts being broken away.

Referring to FIGS. 1 to 6, the numeral 15 designates a baseball scoring indicator constructed in accordance with the invention. The indicator comprises a rigid flat rectangular frame 16 of hollow laminated construction, desirably of pocket size, having parallel front and back plates 17 and 18 and interposed laminated filler material 19 secured thereto, these plates being formed of stiff cardboard or plastic. The filler material may also include one or more spacer blocks 20.

Between the front and back plates are disposed at different locations a number of indicia-bearing indicator disks comprising a first set of three coaxial disks 21, 22 and 23, a second identical set of three coaxial disks 24, 25 and 26, a third set of two coaxial disks 27 and 28 of smaller diameter, and three single disks 29, 30 and 31 of still smaller diameter. The multiple disk sets and the three single disks are secured to the frame by respective pivot-forming rivets or grommets 32 here shown to be surrounded by spacer sleeves 33, the filler material being cut away to provide clearance for the disks. The indicator disks are desirably formed of thin but relatively stiff plastic material, and at least some of the disks are wholly or partially transparent, as hereinafter described. The two three-unit disk assemblies are disposed near one side of the frame and the other disks are disposed near the opposite side of the frame. The disk peripheries are exposed at notches 34 formed in the opposite edges of the frame so as to permit manual rotation or setting of the disks by the user's finger tips. The peripheral edges of the various disks may be roughened or milled. The middle disk of each three-unit disk assembly is preferably slightly larger in diameter than the flanking disks so as to facilitate individual manipulation of the disks. If desired, thin washers 35 may be interposed between the frame plates and the adjacent disks. Disk spacers 36 in the form of thin plastic strips, washers or spiders are interposed between the coaxial disks and are anchored on the frame so as to prevent frictional drive between the adjacent disks. The disk spacers are here shown to form parts of the frame filler. The indicator disks are each frictionally retained in angularly adjusted position. The various disks are preferably transparent, at least at the peripheral portions thereof.

In the present instance, each of the rear disks 23 and 26 of each three-disk assembly carries near its periphery the names 37 of the teams in a baseball league, these names extending in a tangential direction and being equally spaced about the disk. These team names on the rear disks are selectively visible through respective horizontally extending windows or openings 38 in the front plate 17 and through the transparent peripheral portions of the associated front and middle disks, each window 38 being spaced vertically above the pivot member 32 for the disk assembly. The front and middle disks of each three-disk assembly carry respective concentric radially adjacent series or bands of equally spaced digits 39 and 40 from 0 to 9, which are selectively visible through a horizontally extending window 41 in the front plate spaced 90° about the disk assembly axis from the team indicator window 38, the two concentric series of digits being adapted to make up either one-digit or two-digit numbers representing the run score of the opposing teams. The circularly arranged digits 39 and 40 are "units" digits and "tens" digits, respectively. The digits 40 of the inner series are here shown to be carried on the middle disk 22 or 25, FIG. 6, and are visible through the transparent front disk 21 or 24 which carries the digits of the outer series. If desired, the zero digit on the middle disk may be omitted. In some instances, the back frame plate 18 may be provided with windows 38' and 41' registering with the front plate windows 38 and 41 to permit illumination of the disk indicia from the rear. The team names and number of runs each read horizontally when the indicator device is held in the normal position shown in FIG. 1.

The two coaxial disks 27 and 28 of the two-disk assembly are generally similar to the front and middle disks 21 and 22 of the three-disk assembly but are of smaller diameter. The disks 27 and 28, which are of the same diameter, carry respective inner and outer concentric radially adjacent series of equally spaced digits 42 and 43 from 0 to 9 which are selectively visible through a horizontally extending window 44 in the front plate to make up either one-digit or two-digit numbers representing the innings of the game. The digits 42 and 43 are units digits and tens digits, respectively. In some instances, the back plate may be provided with an illuminating window 44′, FIG. 5, registering with the front plate window.

The single disks 29, 30 and 31 carry respective circular series of numbers or digits 45, 46 and 47 representing "balls," "strikes" and "outs" and are visible through respective windows 48 formed in the front frame plate. If desired, illuminating windows 48′ may be formed in the back plate in registry with the front plate windows.

The front plate 17 is provided with a representation of a baseball diamond 49 and carries pivoted frictionally retained indicator fingers 50 at the inner sides of the first, second and third base positions, the fingers being pivotally secured to the front plate by rivets 51. Each indicator finger or element can be turned outwardly toward the corresponding base position to represent a player at that position.

When the indicator is in use by a person viewing or listening to a baseball game, the rear disks 23 and 26 carrying the team names are manually rotated to bring the names of the opposing teams to view in the two front plate windows 38 and all the other disks are manually set to the zero positions except that the "inning" disk 27 is set to indicate the first inning. As the game progresses, the various disks are rotatably set to indicate the "runs" of the respective teams, and the balls, strikes, outs and innings, and the indicator fingers 50 are turned to indicate the players on bases.

The modified form of indicator disk spacer 36′ shown in FIG. 7 comprises a thin washer, such as of plastic material, having one or more radial arms 52, the outer ends of which are loosely fitted in notches 53 formed in frame filler plates 19′ so as to retain the washer against rotation and thus prevent undesired frictional drive between adjacent coaxial disks, such as the disks 27 and 28. The spider-like spacer plate thus formed is readily mounted on the pivot member 32 during assembly of the frame, and permits the use of fewer or thicker frame spacers or filler plates for a frame of given depth. In FIGS. 2, 4 and 5 the relative depth of the frame 16 is somewhat exaggerated.

The football game scoring indicator 55 shown in FIG. 8 is generally similar in construction to the baseball game scoring indicator of FIG. 1 and carries appropriate scoring indicia. The indicator 55 comprises a flat rectangular frame 56 of hollow laminated construction similar to that of FIG. 1 and including apertured front and back frame plates 57 and 58 and interposed filler material 59. Dual-type indicator disks 60, 61 and 62, and single-type indicator disks 63 and 64 are pivotally mounted in the frame by pivot members 65. The dual-type disks 60, 61 and 62 are similar to the inning disks 27, 28 of FIG. 1, and the single-type disks being similar to the strikes disks 30 of FIG. 1. The edges of the frame are provided with notches 66 exposing the peripheries of the disks to permit manual setting of the disks. The disks 60 and 61 serve to display either one-digit or two-digit numbers through windows 67 in the front plate and indicate the visiting team score and the home team score. The dual disks 62 display two-digit numbers indicating the "yards," these numbers being visible through a window 68, while the single disks 63 and 64 display one-digit numbers for the "quarters" and the "downs," these numbers being visible through windows 69.

A stiff cover 70 is attached to an end of the frame 56 by a flexible hinge-forming backing 71. A rectangular transparent sheet 72 is marginally secured to the inner face of the cover and forms two laterally adjacent pockets 73 to detachably receive cards 74 identifying the players on the visiting and home teams. If desired, a similar pocket-carrying cover may be hingedly attached to the frame of the baseball scoring indicator of FIG. 1.

The invention is also applicable to other forms of indicators, such as for card games, and may be embodied in various game devices.

I claim:
1. In an indicator device, a frame having a front plate with a window therein, a pair of coaxial individually settable indicator disks of substantially the same diameter disposed at the rear of said front plate in axially adjacent relation and pivoted on said frame, said disks having exposed manually engageable peripheral portions and having respective forwardly facing concentric radially adjacent inner and outer circular series of digits thereon selectively visible through said window to display two-digit numbers made up of digits in said radially adjacent circular series, the digits in one circular series being units digits, and the digits in the other circular series being tens digits.

2. In an indicator device, a frame having a front plate with a window therein, a pair of coaxial individually settable indicator disks of substantially the same diameter disposed at the rear of said front plate in axially adjacent relation and pivoted on said frame, said disks having respective forwardly facing concentric radially adjacent circular series of digits thereon selectively visible through said window to display two-digit numbers made up of digits in said radially adjacent circular series, the digits in one circular series being units digits, and the digits in the other circular series being tens digits, the forward one of said disks being transparent for viewing therethrough the digits on the rearward disk.

3. In an indicator device, a frame having a front plate with a pair of windows therein, a pair of coaxial individually settable indicator disks disposed at the rear of said front plate in axially adjacent relation and pivoted on said frame, said windows being disposed at different radii with respect to the axis of said disks, said disks having respective forwardly facing indicia arranged in circular series and selectively visible through said respective windows, the indicia on one of said disks being disposed in the series of larger diameter comprising team names disposed in a tangential direction, and the indicia on the other disk comprising scoring digits disposed in a radial direction, the window displaying said team names extending horizontally, said windows being spaced substantially 90° about the axis of said disks so that the team names and scoring digits are readable horizontally.

4. In an indicator device, a frame having front and back plates, said front plate having a window therein, a rotatively settable transparent indicator disk disposed between said plates and pivoted on said frame, said disk having a series of forwardly facing indicia thereon selectively visible through said window, and said back plate being apertured for permitting illumination of said indicia from the rear through said transparent disk.

5. In an indicator device, a frame having a windowed front plate, and a set of three coaxial individually settable indicator disks disposed at the rear of said front plate in axially adjacent relation and pivoted to said frame, said disks having exposed manually engageable peripheral portions to permit setting of the disks by the user's finger tips, the intermediate disk being slightly larger in diameter than the outer disks, and said disks having respective forwardly facing indicia thereon selectively visible through said windowed front plate.

6. In an indicator device, a frame having an apertured front plate, individually settable indicator disks disposed at the rear of said front plate and pivoted on said frame, said disks having forwardly facing indicia representing scoring information for a baseball game, said indicia being selectively visible through said apertured front plate, said front plate having thereon a representation of a baseball diamond including base positions, and indicator elements pivotally carried by said frame and individually swingable to said base positions to represent players at said base positions.

(References on following page)

References Cited by the Examiner

UNITED STATES PATENTS

| | | | |
|---|---|---|---|
| 1,076,929 | 10/1913 | Williamson | 235—88 |
| 1,801,225 | 4/1931 | Craven | 235—88 |
| 1,878,629 | 9/1932 | Furey et al. | 116—120 |
| 2,304,797 | 12/1942 | Collins | 235—61 |
| 2,427,976 | 9/1947 | Posson | 235—88 |
| 2,674,410 | 4/1954 | Bernstein | 235—88 |
| 2,993,288 | 7/1961 | Rothman | 40—70 |
| 3,006,315 | 10/1961 | Rothman | 116—120 X |
| 3,047,221 | 7/1962 | Alfaga et al. | 235—64.7 |

LEO SMILOW, *Primary Examiner.*